UNITED STATES PATENT OFFICE.

AUGUST H. CRONEMEYER, OF NEW YORK, N. Y.

PROCESS OF SOLIDIFYING VOLATILE HYDROCARBONS AND ALCOHOL AND PRODUCTS THEREOF.

SPECIFICATION forming part of Letters Patent No. 718,318, dated January 13, 1903.

Application filed May 25, 1901. Serial No. 61,861. (No specimens.)

*To all whom it may concern:*

Be it known that I, AUGUST H. CRONEMEYER, a citizen of the United States, and a resident of the city of New York, borough of Manhattan, in the county and State of New York, have invented a certain new and useful Process of Solidifying Volatile Hydrocarbons, of which the following is a full, clear, and exact description.

The object of my invention is to provide a new means of solidifying inflammable hydrocarbons in order to obtain a congealed product which when ignited will burn without melting the body of the product and without danger of explosion.

The process in question is particularly applicable to the solidification of alcohol, naphtha, benzol, benzin, and gasolene.

Briefly described, my process consists in adding to the hydrocarbon to be solidified sodium hydrate, wood-alcohol, stearin, and resin (colophony) in the peculiar manner to be hereinafter described.

The invention also consists in the novel methods which will be fully described hereinafter and then pointed out in the claims.

In carrying out my process I employ four vessels. In the first vessel is contained a solution of sodium hydrate, which solution consists of one part caustic soda and one and a half parts water. The second vessel contains five parts of wood or other alcohol, (eighty-eight per cent. to ninety-six per cent.) In the third vessel five parts of stearin and two and a half parts of resin (colophony) are contained. The hydrocarbon to be solidified, to the amount of fifty parts, is contained in the fourth vessel. The contents of the first vessel, consisting of sodium hydrate of the consistency specified, are heated in a water-bath substantially to the boiling-point. The contents of the second vessel, consisting of alcohol, are heated in a water-bath to the boiling-point or thereabout. The contents of the third vessel, consisting of stearin and resin in the proportions specified, are also heated in a water-bath to about the boiling-point, and the contents of the fourth vessel, consisting of naphtha, benzin, benzol, alcohol, gasolene, or other hydrocarbon to be solidified, are heated in a water-bath to the boiling-point. When the four solutions are sufficiently heated, the contents of vessel No. 1 are slowly poured into vessel No. 2 and intimately mingled with the alcohol therein contained. The resulting compound is then poured into vessel No. 3 and intimately mingled with the heated stearin and resin. Finally the mixture thus obtained, consisting of the intermingled contents of vessels 1, 2, and 3, is poured into vessel No. 4, containing the hydrocarbon to be solidified, and intimately mingled therewith. Upon pouring the mixture consisting of the contents of vessels 1, 2, and 3 into vessel 4 the entire mass begins to congeal and is then allowed to cool. In order to obtain a mass which thus congeals within a short time after the mixture of the various ingredients, it is of considerable importance to use the proportions specified and to heat the ingredients approximately to the boiling-point. Very material variation from the directions given will produce merely a solidified mass after cooling, such as can be obtained by the employment of saponified fats. The product which is thus obtained is a brownish-yellow semiopaque cellular compound, which can be readily cut with a knife and from which the hydrocarbon can be squeezed. It is a distinguishing feature of the product that it burns on the surface without melting the body, giving a vivid light and an intense heat. Volatile hydrocarbons solidified by saponified fats, on the other hand, will melt when ignited.

The process herein described, whereby hydrocarbons are congealed, is to be distinguished from the process of solidifying by the use of saponified fats, inasmuch as no residue is left in the final-mixing vessel. The product can be handled, packed, shipped, and used with perfect safety.

Having thus described my invention, I claim as new and desire to secure by Letters Patent—

1. A product formed of one part sodium hydrate, one and one-half parts water, five parts alcohol, five parts stearin, two and one-half parts colophony, and fifty parts of an inflammable hydrocarbon.

2. The herein-described process of solidifying by congelation, an inflammable hydrocarbon which consists in mingling a heated solution of sodium hydrate with heated alcohol; mingling the product obtained with heated stearin; and mingling the combined sodium hydrate, alcohol, stearin and colophony with the heated hydrocarbon to be solidified.

3. The herein-described process of solidifying by congelation an inflammable hydrocarbon which consists in separately heating one part caustic soda and one and one-half parts water, five parts alcohol, five parts stearin, together with two and one-half parts colophony and fifty parts of the inflammable hydrocarbon to be solidified; intimately mingling the solution of caustic soda with the alcohol thus heated; intimately mixing the resulting product with the heated stearin and colophony; and intimately mixing the combined soda solution, alcohol, stearin and colophony with the heated inflammable hydrocarbon to be solidified.

In testimony whereof I have signed my name to this specification in the presence of two witnesses.

AUGUST H. CRONEMEYER.

Witnesses:
  I. T. GORSLINE,
  JAMES J. SARGENT.